United States Patent
Nakamura et al.

(10) Patent No.: US 10,138,925 B2
(45) Date of Patent: Nov. 27, 2018

(54) FRP DRIVE SHAFT

(71) Applicants: FUJIKURA RUBBER LTD., Tokyo (JP); HONDA MOTOR CO., LTD., Tokyo (JP)

(72) Inventors: Takato Nakamura, Saitama (JP); Masako Okochi, Saitama (JP); Naoki Kimoto, Saitama (JP); Tsuyoshi Matsuda, Kanagawa (JP); Yuji Katayama, Tochigi (JP); Michihiro Komatsu, Tochigi (JP)

(73) Assignees: FUJIKURA RUBBER LTD., Tokyo (JP); HONDA MOTOR CO., LTD., Tokyo (JP)

( * ) Notice: Subject to any disclaimer, the term of this patent is extended or adjusted under 35 U.S.C. 154(b) by 72 days.

(21) Appl. No.: 15/310,257

(22) PCT Filed: Mar. 6, 2015

(86) PCT No.: PCT/JP2015/056607
§ 371 (c)(1),
(2) Date: Nov. 10, 2016

(87) PCT Pub. No.: WO2015/182206
PCT Pub. Date: Dec. 3, 2015

(65) Prior Publication Data
US 2017/0152884 A1    Jun. 1, 2017

(30) Foreign Application Priority Data
May 26, 2014  (JP) .................................. 2014-107972

(51) Int. Cl.
*F16C 3/02* (2006.01)
*F16D 1/027* (2006.01)
(Continued)

(52) U.S. Cl.
CPC .............. *F16C 3/023* (2013.01); *F16C 3/026* (2013.01); *F16D 1/027* (2013.01); *F16D 1/068* (2013.01);
(Continued)

(58) Field of Classification Search
CPC ........ F16B 7/02; F16B 7/0406; F16B 7/0413; F16C 3/023; F16C 3/026; F16D 1/027;
(Continued)

(56) References Cited
U.S. PATENT DOCUMENTS 3,638,979 A    2/1972   Francois et al.
3,847,694 A *  11/1974  Stewing .................. B29C 61/00
                                                     156/86
(Continued)

FOREIGN PATENT DOCUMENTS

CN    102472310 A    5/2012
EP    0537035 A1 *  4/1993   .............. F16C 3/026
(Continued)

OTHER PUBLICATIONS

International Search Report, dated Jun. 9, 2015 (Jun. 9, 2015), PCT/JP2015/056607.
Ohinese Office Action dated Jun. 1, 2018, 5 pages.

*Primary Examiner* — Josh Skroupa
(74) *Attorney, Agent, or Firm* — Rankin, Hill & Clark LLP

(57) ABSTRACT

An FRP drive shaft includes an end joint joined to at least one end of an FRP cylinder via an outer collar. The end joint includes a serrated portion on an outer periphery thereof. The outer collar includes a small-diameter collar portion and a large-diameter collar portion. The serrated portion is press-fitted into an inner periphery of the FRP cylinder and fixed to an inner periphery of the small-diameter collar portion. A gap between an inner periphery of the large-
(Continued)

diameter collar portion and an outer periphery of the FRP cylinder is filled with an adhesive for fixing the inner periphery of the large-diameter collar portion and the outer periphery of the FRP cylinder to each other. An adhesive-accumulating space which partially increases a filling amount of the adhesive is formed between the inner periphery of the large-diameter collar portion and the outer periphery of the FRP cylinder.

6 Claims, 7 Drawing Sheets

(51) Int. Cl.
 *F16D 1/068* (2006.01)
 *F16D 1/08* (2006.01)
(52) U.S. Cl.
 CPC ......... *F16D 1/0858* (2013.01); *Y10T 403/473* (2015.01)
(58) Field of Classification Search
 CPC ........ F16D 1/068; F16D 1/0858; F16D 1/087; F16D 2003/102; F16D 2250/0069; Y10T 403/471–403/473; Y10T 403/477; Y10T 403/66
 USPC .......... 464/181–183; 403/266–268, 270, 341
 See application file for complete search history.

(56) References Cited

U.S. PATENT DOCUMENTS

| | | | |
|---|---|---|---|
| 3,920,268 A | 11/1975 | Stewing | |
| 4,451,245 A | 5/1984 | Hornig et al. | |
| 6,742,258 B2* | 6/2004 | Tarbutton | B21D 26/033 29/421.1 |
| 8,834,059 B2* | 9/2014 | Watkins | F16B 11/008 403/268 |
| 8,876,614 B2 | 11/2014 | Nakamura et al. | |
| 8,979,416 B2* | 3/2015 | Itoh | B32B 37/18 228/173.6 |
| 9,227,375 B2* | 1/2016 | Carrere | B32B 1/08 |
| 9,382,933 B2* | 7/2016 | Sottiaux | B64D 27/26 |
| 2002/0041790 A1 | 4/2002 | Suzuki et al. | |
| 2003/0157988 A1 | 8/2003 | Nonogaki et al. | |
| 2012/0157217 A1* | 6/2012 | Nakamura | F16C 3/026 464/181 |

FOREIGN PATENT DOCUMENTS

| | | |
|---|---|---|
| JP | 04-140514 | 5/1992 |
| JP | 08-103965 | 4/1996 |
| JP | 2003-237396 | 8/2003 |
| JP | 2011-052719 | 3/2011 |

* cited by examiner

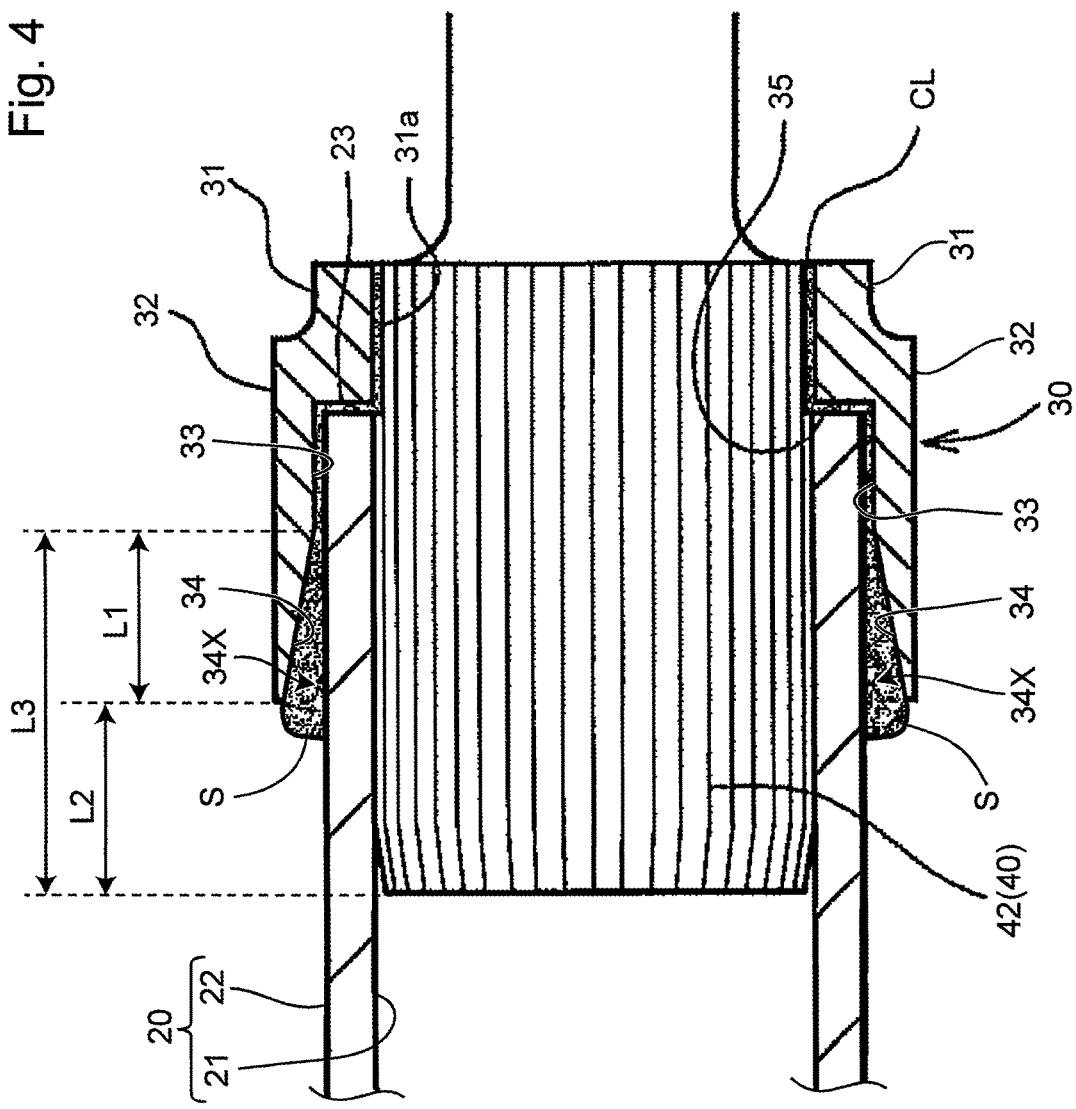

FRP DRIVE SHAFT

TECHNICAL FIELD

The present invention relates to an FRP drive shaft including an FRP cylinder and an end joint (s) which can be used for, e.g., a propeller shaft, a drive shaft and a stabilizer bar of a vehicle.

BACKGROUND ART

FRP drive shafts are made by joining two metal end joints to either end of an FRP (Fiber Reinforced Plastics) cylinder and have the advantage of being lightweight. However, how to increase the joint strength between the FRP cylinder and each end joint has been a technical problem to be solved, and various proposals have been submitted for solving this problem.

FIGS. 7A and 7B show an FRP drive shaft 1 that is disclosed in Patent Literature 1. The FRP drive shaft 1 is provided with an FRP cylinder 2, two end joints 3 made of metal which are joined to either end of the FRP cylinder 2, and two outer collars 4, each of which is fixed to an outer periphery of the FRP cylinder 2. In these drawings, only a portion of the FRP drive shaft 1 in the vicinity of one end of the FRP cylinder 2 is shown in the drawing, and hence, the other portion of the FRP drive shaft 1 in the vicinity of the other end of the FPR cylinder 2 is not shown in the drawings.

In the FRP drive shaft 1, to fix the end joints 3 to the FRP cylinder 2, each end joint 3 is provided on an outer periphery thereof with a serrated portion 5, and this serrated portion 5 is press-fitted into an inner periphery of the FRP cylinder 2. In addition, to fix each outer collar 4 to an outer periphery of the FRP cylinder 2, each end joint 3 is provided with an oval-shaped non-circular cross sectional shaft portion 6, an oval-shaped non-circular engaging hole 7 is formed in each outer collar 4, and the non-circular cross sectional shaft portion 6 and the non-circular engaging hole 7 are engaged with each other.

CITATION LIST

Patent Literature

Patent Literature 1: Japanese Unexamined Patent Publication No. 2011-52719

SUMMARY OF THE INVENTION

Technical Problem

However, in the FRP drive shaft 1 that is disclosed in Patent Literature 1, the serrated portion 5, which is to be fixed into the FRP cylinder 2, and the non-circular cross sectional shaft portion 6, which is to be fixed into the outer collar 4, are required to be machined independently on each end joint 3, and a special machining process must also be performed on each outer collar 4 to form the non-circular engaging hole 7 therein. Therefore, the structure and the production of the FRP drive shaft 1 is inevitably complicated and the production cost of the FRP drive shaft 1 is increased.

The present invention has been devised in view of the above described issues, and an object of the present invention is to achieve an FRP drive shaft in which the joint strength between the FRP cylinder and an end joint(s) is enhanced and simplification in the structure, facilitation in production and reduction in production cost are achieved.

Solution to Problem

An FRP drive shaft according to the present invention includes an end joint joined to at least one end of an FRP cylinder via an outer collar. The end joint includes a serrated portion on an outer periphery thereof. The outer collar includes a small-diameter collar portion and a large-diameter collar portion which is greater in diameter than the small-diameter collar portion. The serrated portion is press-fitted into an inner periphery of the FRP cylinder and fixed to an inner periphery of the small-diameter collar portion. A gap between an inner periphery of the large-diameter collar portion and an outer periphery of the FRP cylinder is filled with an adhesive for fixing the inner periphery of the large-diameter collar portion and the outer periphery of the FRP cylinder to each other. An adhesive-accumulating space which partially increases a filling amount of the adhesive is formed between the inner periphery of the large-diameter collar portion and the outer periphery of the FRP cylinder. The large-diameter collar portion includes a constant-diameter portion and an adhesive-accumulating tapered portion which are formed on the inner periphery of the large-diameter collar portion. The constant-diameter portion is formed on the inner periphery of the large-diameter collar portion at a position closer to the small-diameter collar portion. A distance between the constant-diameter portion and the outer periphery of the FRP cylinder is substantially constant. A distance between the adhesive-accumulating tapered portion and the outer periphery of the FRP cylinder progressively increases in a direction away from the small-diameter collar portion. The adhesive-accumulating space is formed between the adhesive-accumulating tapered portion and the outer periphery of the FRP cylinder.

The serrated portion can be press-fitted into the inner periphery of the FRP cylinder and the inner periphery of the small-diameter collar portion so as to extend over the inner periphery of the FRP cylinder and the inner periphery of the small-diameter collar portion.

It is desirable for an axial length of the adhesive-accumulating tapered portion to be set within a range of 5 mm through 15 mm.

It is desirable for a fore end of the adhesive-accumulating tapered portion and a fore end of the serrated portion to be offset from each other within a range of 5 mm through 15 mm.

It is desirable for a base end of the adhesive-accumulating tapered portion and the fore end of the serrated portion to be offset from each other within a range of 10 mm through 30 mm.

It is desirable for a taper ratio of the adhesive-accumulating tapered portion to be within a range of 0.5/15 through 2/5.

Advantageous Effects of the Invention

According to the present invention, an FRP drive shaft in which the joint strength between the FRP cylinder and an end joint(s) is enhanced and simplification in the structure, facilitation in production and reduction in production cost are achieved can be obtained.

BRIEF DESCRIPTION OF DRAWINGS

FIG. 4 is an enlarged view of the IV portion shown in FIG. 3;

EMBODIMENTS

<Structure of FRP Drive Shaft 10>

Figure 1:
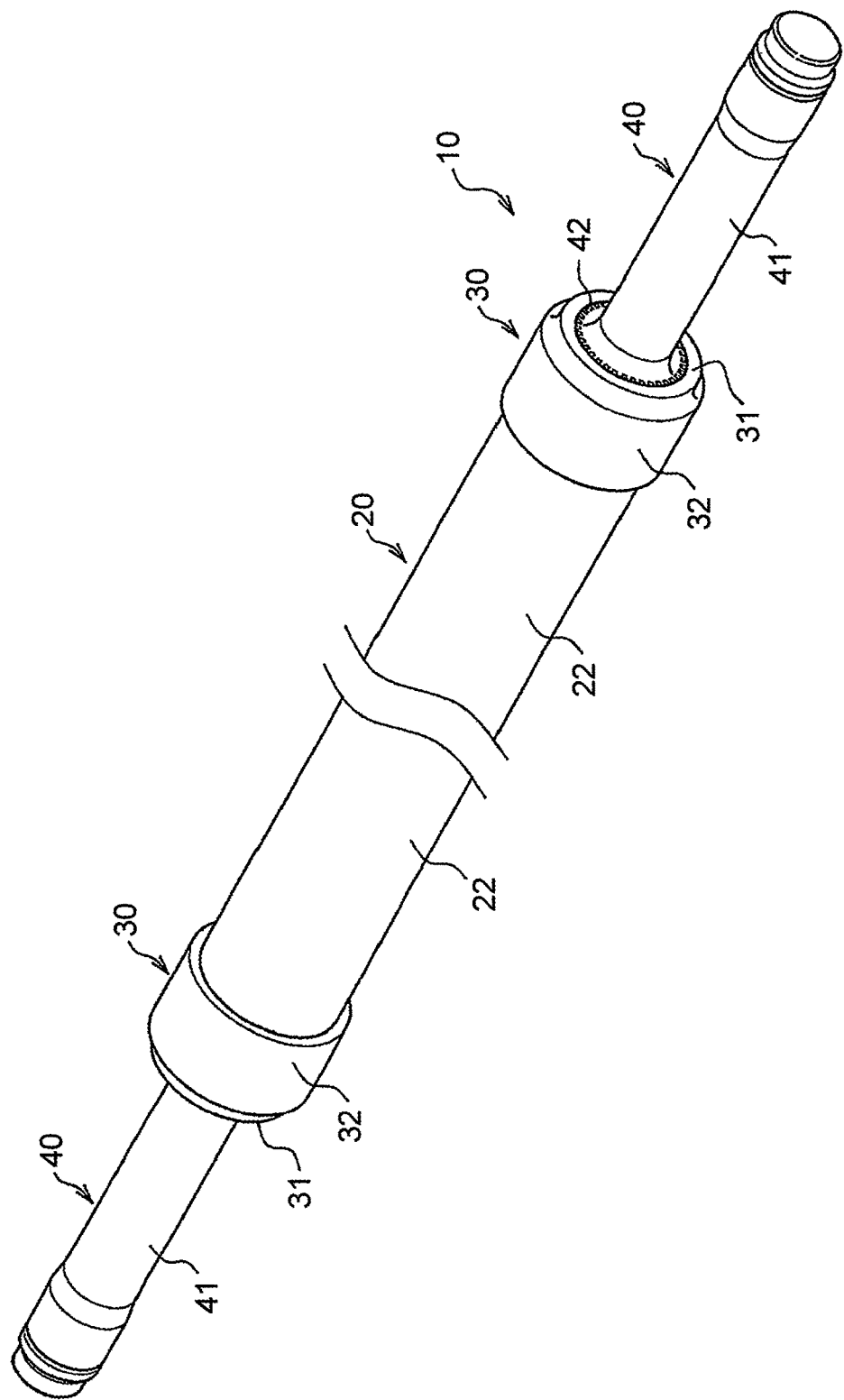
FIG. 1 is a perspective view of an FRP drive shaft according to the present invention, illustrating an assembled state thereof.
Figure 2:
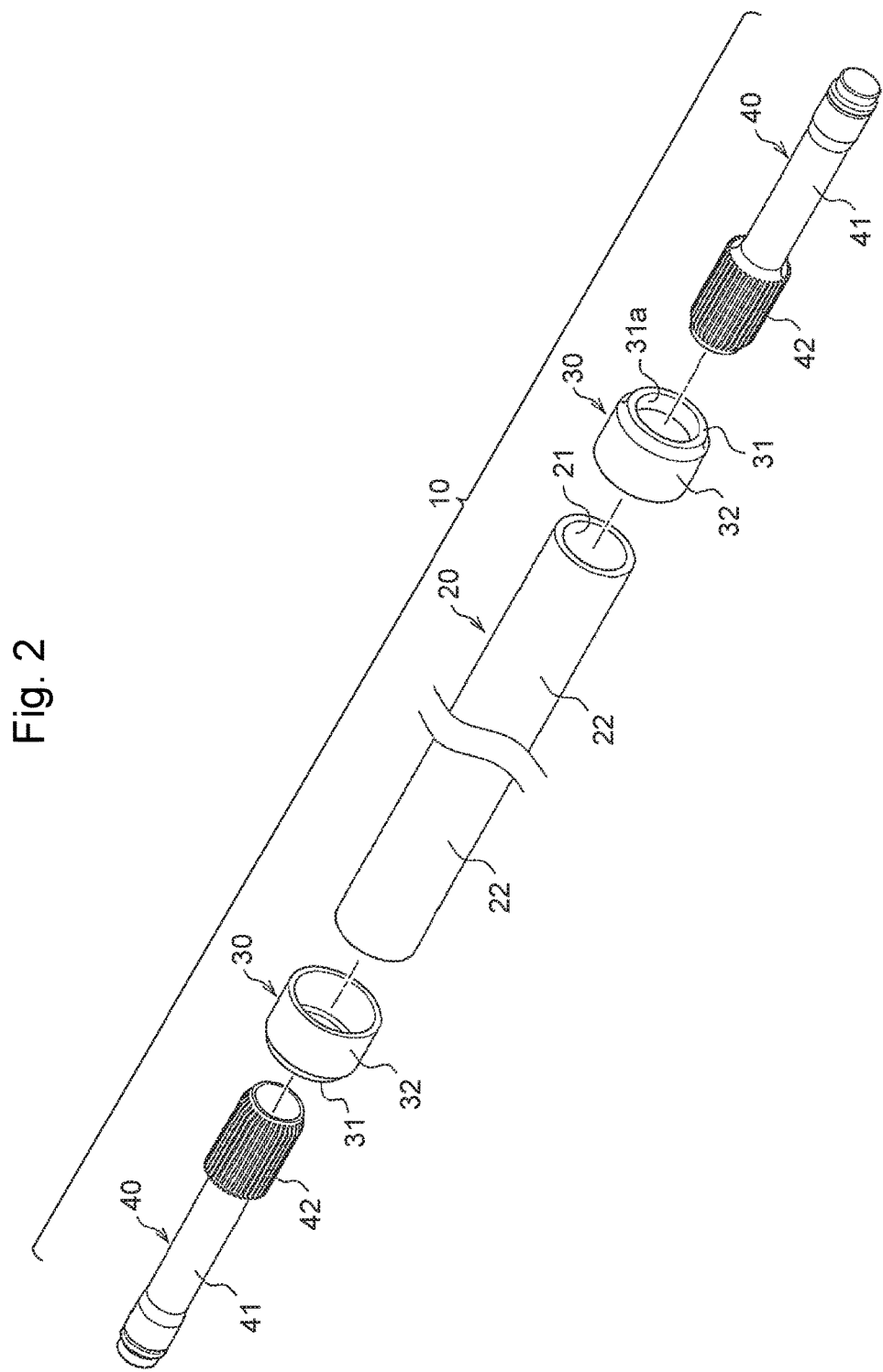
FIG. 2 is an exploded perspective view of the FRP drive shaft according to the present invention.
Figure 3:
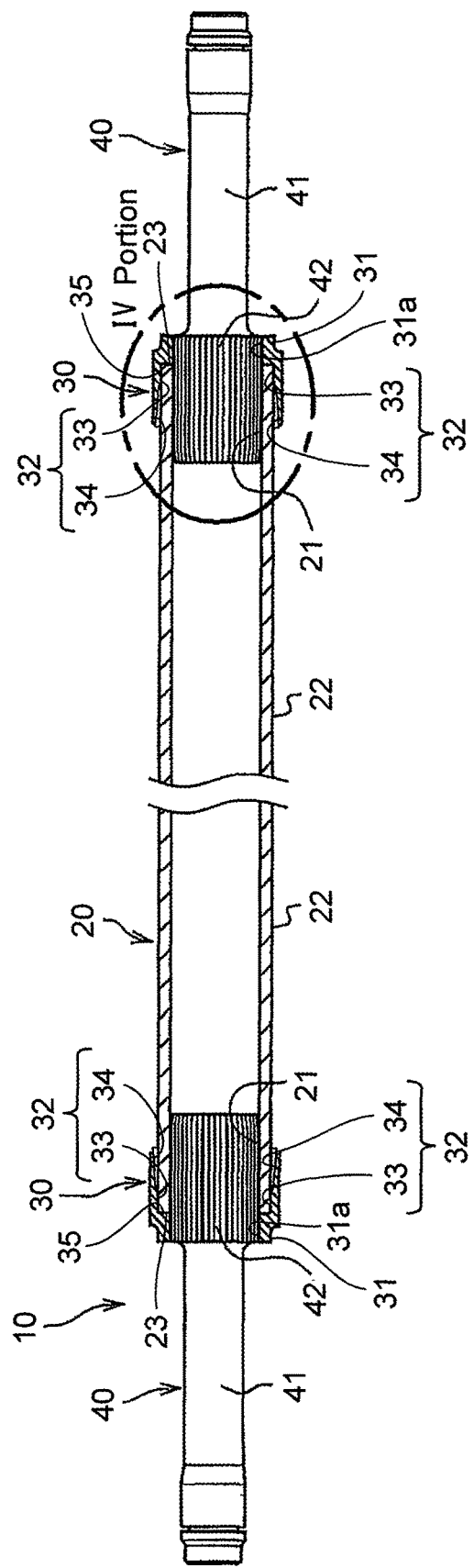
FIG. 3 is a longitudinal sectional view of the FRP drive shaft according to the present invention, taken along the axial direction thereof.

The configuration of an FRP drive shaft 10 according to the present invention will be hereinafter discussed with reference to FIGS. 1 through 4. The FRP drive shaft 10 is made by joining two end joints 40 to either end of an FRP cylinder 20 via two outer collars 30, respectively. In the present embodiment, the two outer collars 30 are identical in structure, thus designated by the same reference numeral s to be discussed hereinafter, and the two end joints 40 are identical in structure, thus designated by the same reference numerals to be discussed hereinafter.

The FRP cylinder 20 is configured of a plurality of CFRP (Carbon Fiber Reinforced Plastic) layers by winding a plurality of prepregs, which are made by impregnating thermosetting resin sheets with carbon reinforcement fibers, into a cylinder and thermally curing the plurality of prepregs thus wound. The FRP cylinder 20 has flexibility in configuration and production method, so that making various modifications to the design of the FRP cylinder 20 is possible. For instance, it is possible to make the FRP cylinder b injection-molding resin, in which short carbon fibers are dispersed. The diameter (inner diameter) of the inner periphery of the FRP cylinder 21 and the diameter (outer diameter) of the outer periphery of the FRP cylinder 22 are substantially constant over the axial length of the FRP cylinder 20.

The end joints 40 are made of a metallic material such as iron steel and are each provided with a solid rod portion 41 in the shape of a solid rod. The end joints 40 are each provided with a serrated portion 42 which is pressed-fitted into an inner periphery 21 of the FRP cylinder 20, along the axial direction of the solid rod portion 41. The serrated portion 42 of each end joint 40 is formed from, e.g., triangular serrations or involute serrations. The serrated portion 42 of each end joint 40 can be formed of a series of serrations which are each formed continuously in the axial direction of the end joint 40 as shown in the drawings, or can be formed of a series of serrations which are each divided into a plurality of portions aligned along the axial direction of the end joint 40.

The outer collars 30 are made of, e.g., a metallic material such as aluminum and are each formed of an annular member having a small-diameter collar portion 31 and a large-diameter collar portion 32, greater in diameter than the small-diameter portion 31, which are continuously formed integral with each other along the axial direction of the outer collar 30.

The small-diameter collar portion 31 is provided on an inner periphery thereof with a press-fitting portion 31a. The press-fitting portion 31a of each outer collar 30 is press-fitted onto another portion (at the base end) of the serrated portion 42 of one end joint 40 that is not press-fitted into the inner periphery 21 of the FRP cylinder 20. Accordingly, the serrated portion 42 of each end joint 40 is press-fitted into the inner periphery 21 of the FRP cylinder 20 and the inner periphery (the press-fitting portion 31a) of the small-diameter collar portion 31 (FIGS. 3 and 4) so that the end joint 40 extends along these inner peripheries. In other words, rather than the serrated portion 42 of each end joint 40 being press-fitted into the inner periphery 21 of the FRP cylinder 20 over the entire length of the serrated portion 42 in the axial direction thereof, a portion of the serrated portion 42 in the axial direction thereof (on the distal end side) is press-fitted into the inner periphery 21 of the FRP cylinder 20 while the remaining portion of the serrated portion (at the base end) is not press-fitted into the inner periphery 21 of the FRP cylinder 20. A clearance CL is formed between the press-fitting portion 31a of the small-diameter portion 31 of each outer collar 30 and the serrated portion 42 of the associated end joint 40 (FIG. 4).

As shown in FIG. 4, the large-diameter portion 32 is provided on an inner periphery thereof with a constant-diameter portion 33 and an adhesive-accumulating tapered portion 34. The constant-diameter portion 33 is formed on the side closer to the small-diameter collar portion 31, and the distance of the constant-diameter portion 33 from the outer periphery 22 of the FRP cylinder 20 is substantially constant. The distance of the adhesive-accumulating tapered portion 34 from the outer periphery 22 of the FRP cylinder 20 progressively increases in a direction away from the small-diameter collar portion 31. The gap between the inner periphery (the constant-diameter portion 33 and the adhesive-accumulating tapered portion 34) of the large-diameter collar portion 32 and the outer periphery 22 of the FRP cylinder 20 is filled with an adhesive S for fixing the inner periphery of the large-diameter collar portion 32 and the outer periphery 22 of the FRP cylinder 20 to each other (the adhesive S is disposed between the inner periphery of the large-diameter collar portion 32 and the outer periphery 22 of the FRP cylinder 20). An adhesive-accumulating space 34X which partially (locally) increases the filling amount of the adhesive S is formed between the adhesive-accumulating tapered portion 34 and the outer periphery 22 of the FRP cylinder 20.

An annular shaped axis-orthogonal wall 35 is formed on each outer collar 30 between the press-fitting portion 31a, which is formed on an inner periphery of the small-diameter collar portion 31, and the constant diameter portion 33, which is formed on an inner periphery of the large-diameter portion 32, and the gap between the axis-orthogonal wall 35 and an end surface 23 of the FRP cylinder 20 is also filled with the adhesive S (the adhesive S is also disposed between the axis-orthogonal wall 35 and the end surface 23 of the FRP cylinder 20).

The clearance CL, provided between the press-fitting portion 31a of the small-diameter portion 31 of each outer collar 30 and the serrated portion 42 of the associated end joint 40, is also filled with the adhesive S. This makes it possible to externally discharge air bubbles trapped in the adhesive S via the clearance CL. In addition, for instance, in the case where the end joints 40 and the outer collars 30 are made of different metals (e.g., iron steel and aluminum), there is a possibility of electrical corrosion occurring due to the difference in electric potential based on ionization tendency between the different metals. In the present embodiment, since a film of the adhesive S, with which the clearance CL is filled, is disposed between the press-fitting portion 31a of the small-diameter portion 31 of each outer collar 30 and the serrated portion 42 of the associated end joint 40, even if the end joints 40 and the outer collars 30 are made of different metals, the different metals are in a mutually noncontact state, which makes it possible to efficiently prevent electrical corrosion from occurring.

When the FRP drive shaft 10 that is constructed as described above is made to function as a drive shaft, an engine (not shown) is coupled to the rod portion 41 of one of the two end joints 40 via an inboard constant-velocity joint and a differential (both not shown), while an axle shaft (not shown) is coupled to the other end joint 40 via an outboard-side constant-velocity joint (not shown). Supplying a rotational driving force from the engine as rotational torque to the FRP drive shaft 10 causes the rotational torque to be transmitted between the end joints 40 and the FRP cylinder 20. The outer collars 30 have the capability of eliminating the difference in rotational torque between the inner peripheral side and the outer peripheral side of the FRP cylinder 20 when rotational torque is transmitted from either end joint 40 to the FRP cylinder 20.

The FRP cylinder 20 and the end joints 40 are fixed to each other by press-fitting the serrated portion 42 of each end joint 40 into the inner periphery 21 of the FRP cylinder 20. On the other hand, each outer collar 30 is fixed to the FRP cylinder 20 with the adhesive S which is filled in between the inner periphery (the constant-diameter portion 33 and the adhesive-accumulating tapered portion 34) of the large-diameter portion 32 and the outer periphery 22 of the FRP cylinder 20, and is simultaneously fixed to the associated end joint 40 by press-fitting the inner periphery (the press-fitting portion 31a) of the small-diameter portion 31 onto the serrated portion 42 of the associated end joint 40 and filling the clearance CL therebetween with the adhesive S. Accordingly, the torque transfer path between each end joint 40 and the FRP cylinder 20 is substantially equally distributed into two routes on the inside and the outside of the FRP cylinder 20, and the inside and the outside of the FRP cylinder 20 rotate in the same phase when torque is transmitted to the FRP cylinder 20, which makes it possible to prevent interlaminar shear fractures from occurring in the FRP cylinder 20, which is a laminated body.

Figures 7A, 7B:
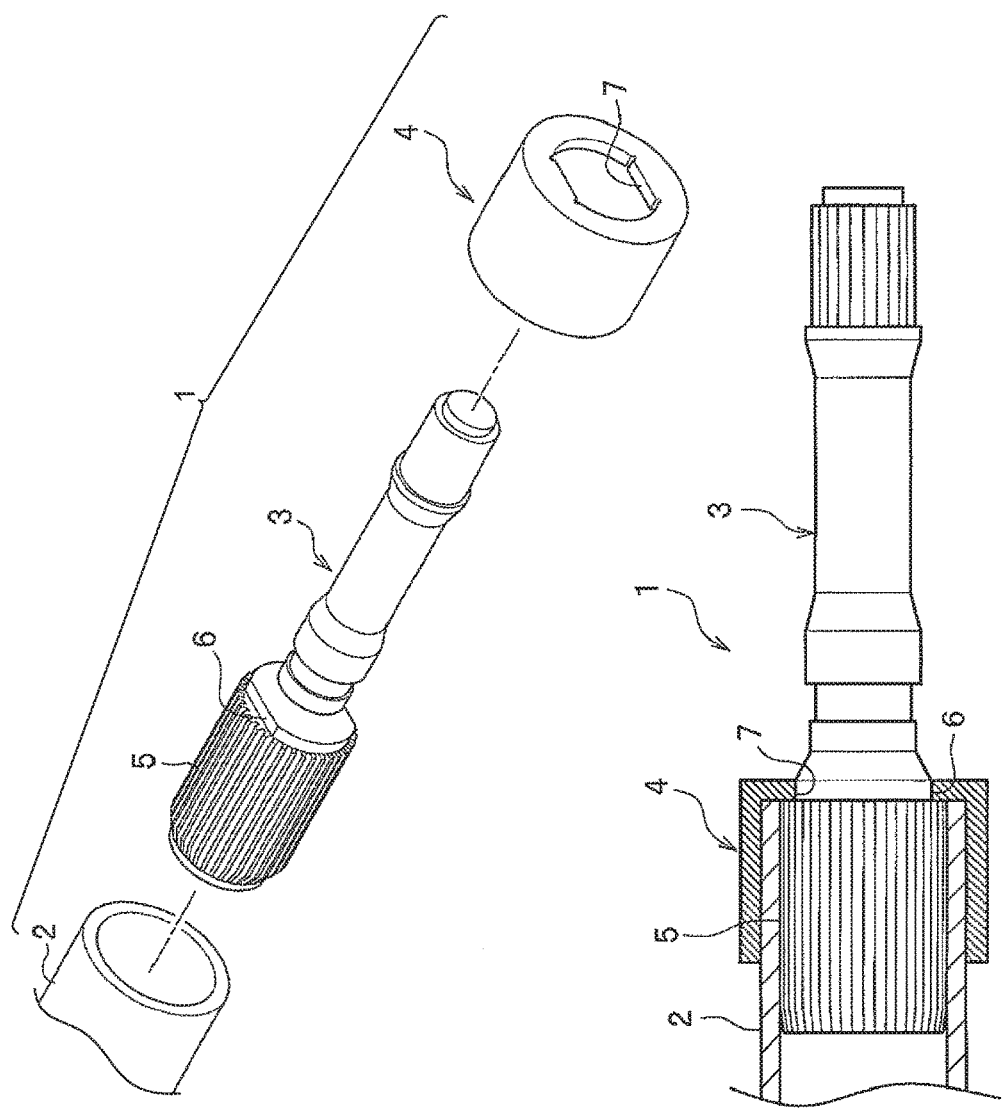
FIGS. 7A and 7B are an exploded perspective view of a conventional FRP drive shaft and a longitudinal sectional view of the same FRP drive shaft taken along the axial direction thereof, respectively, illustrating the joined portion between the FRP cylinder and one of the two end joints.

As described above, in the present embodiment, the serrated portion 42 of each end joint 40 has the following two functional roles: the functional role of fixing the end joint 40 and the FRP cylinder 20 to each other, and the functional role of fixing the end joint 40 and the associated outer collar to each other. This eliminates the requirement of performing a maching process on each end joint to form a special fixing portion thereon (the non-circular cross sectional shaft portion 6 shown in FIGS. 7A and 7B) in a like manner to that in Patent Literature 1 discussed above. Additionally, in the present embodiment, there is no need to perform a special machining process on the outer collars like that disclosed in the case of Patent Literature 1 discussed above (the process of forming the oval-shaped non-circular engaging hole 7 shown in FIGS. 7A and 7B). Hence, according to the present embodiment, an FRP drive shaft 10 in which simplification in the structure, facilitation in production and reduction in production cost are achieved can be obtained.

Additionally, in the present embodiment, the FRP cylinder 20, the outer collars 30 and the end joints 40 are mutually fixed by press-fitting the serrated portion 42 of each end joint 40 into the inner periphery 21 of the FRP cylinder 20 and into the press-fitting portion 31a of the small-diameter collar portion 31 of the associated outer collar 30 so that the end joint 40 extends along these inner peripheries. Simultaneously, the outer collars 30 and the end joints 40 are mutually also fixed with the adhesive S filled in between the inner periphery (the constant-diameter portion 33 and the adhesive-accumulating tapered portion 34) of the associated large-diameter collar portion 32 and the outer periphery 22 of the FRP cylinder 20, filled in between the associated axis-orthogonal wall 35 and the end surface 23 of the FRP cylinder 20, and filled in between the press-fitting portion 31a of the associated small-diameter portion 31 and the associated serrated portion 42 (i.e., in the clearance CL), the FRP cylinder 20. As a result, the FRP cylinder 20 and the end joints 40 are firmly fixed by both the fixing portion on the inner peripheral side of the FRP cylinder 20 and the fixing portion on the outer peripheral side of the FRP cylinder 20, which makes it possible to transmit large rotational torque smoothly.

Additionally, in the present embodiment, each outer collar 30 is provided, on an inner periphery of the large-diameter collar portion 32 thereof, with the adhesive-accumulating tapered portion 34, which is formed to form the adhesive-accumulating space 34X that partially (locally) increases the filling amount of the adhesive S. With this structure, lowering the rigidity by partially (locally) increasing the membrane thickness of an end of the adhesive S disperses the stress on the end (the radially outer side end) of the adhesive S radially inwards to thereby relax (uniformize) this stress when rotational torque is transmitted, which consequently (as a consequence of avoiding stress concentration on the adhesive S) enhances the joint strength between the FRP cylinder 20 and each end joint 40, thereby making it possible to transmit a large rotational torque.

It is desirable that the axial length L1 of the adhesive-accumulating tapered portion 34 be set within the range of 5 mm to 15 mm. This makes transmission of a large rotational torque possible.

If the axial length L1 of the adhesive-accumulating tapered portion 34 exceeds 15 mm, the concentricity between the large-diameter collar portion 32 and the serrated portion increases excessive thereby lowering the adhesive strength.

If the axial length L1 of the adhesive-accumulating tapered portion 34 falls below 5 mm, the stress dispersing effect at the adhesion site becomes insufficient.

The fore end of the adhesive-accumulating tapered portion 34 and the fore end of the serrated portion 42 are offset from each other in the axial direction; it is desirable that the offset length L2 thereof be within the range of 5 mm to 15 mm. This makes transmission of a large rotational torque possible.

If the offset length L2 between the fore end of the adhesive-accumulating tapered portion 34 and the fore end of the serrated portion 42 exceeds 15 mm, the rotational torque concentrates excessively on the serrated portion 42.

If the offset length L2 between the fore end of the adhesive-accumulating tapered portion 34 and the fore end of the serrated portion 42 falls below the 5 mm, the rotational torque concentrates excessively on the outer collar 30.

The base end of the adhesive-accumulating tapered portion 34 and the fore end of the serrated portion 42 are offset from each other in the axial direction; it is desirable that the offset length L3 thereof be within the range of 10 mm to 30 mm. This makes transmission of large rotational torque possible.

If the offset length L3 between the base end of the adhesive-accumulating tapered portion 34 and the fore end of the serrated portion 42 exceeds 30 mm, rotational torque concentrates excessively on the serrated portion 42.

If the offset length L3 between the base end of the adhesive-accumulating tapered portion 34 and the fore end of the serrated portion 42 falls below the 10 mm, rotational torque concentrates excessively on the outer collar 30.

It is desirable that the taper ratio of the adhesive-accumulating tapered portion 34 be within the range of 0.5/15 through 2/5. This makes it possible to improve the adhesive strength between each outer collar 30 and the FRP cylinder 20.

If the taper ratio of the adhesive-accumulating tapered portion 34 exceeds 2/5 or falls below 0.5/15, stress concentrates excessively on the adhesive S.

As an example to be compared with the present embodiment, a configuration is assumed in which the adhesive-accumulating tapered portion 34 is not formed on the inner periphery of the large-diameter portion 32 of each outer collar 30 but is replaced by the constant-diameter portion 33. In this case, displacements of twist that is caused when rotational torque is transmitted are greater on the radially outer side of the FRP cylinder 20 than on the radially inner side thereof; accordingly, stress concentrates excessively on the end (the radially outer side end) of the adhesive S, which would become the starting point of a fracture in the joint between the FRP cylinder 20 and each end joint 40.

<Method of Producing (Assembling) FRP Drive Shaft 10>

A method of producing (assembling) the FRP drive shaft 10 that is configured as described above will be hereinafter discussed with reference to FIGS. 5A and 5B.

Figures 5A, 5B:
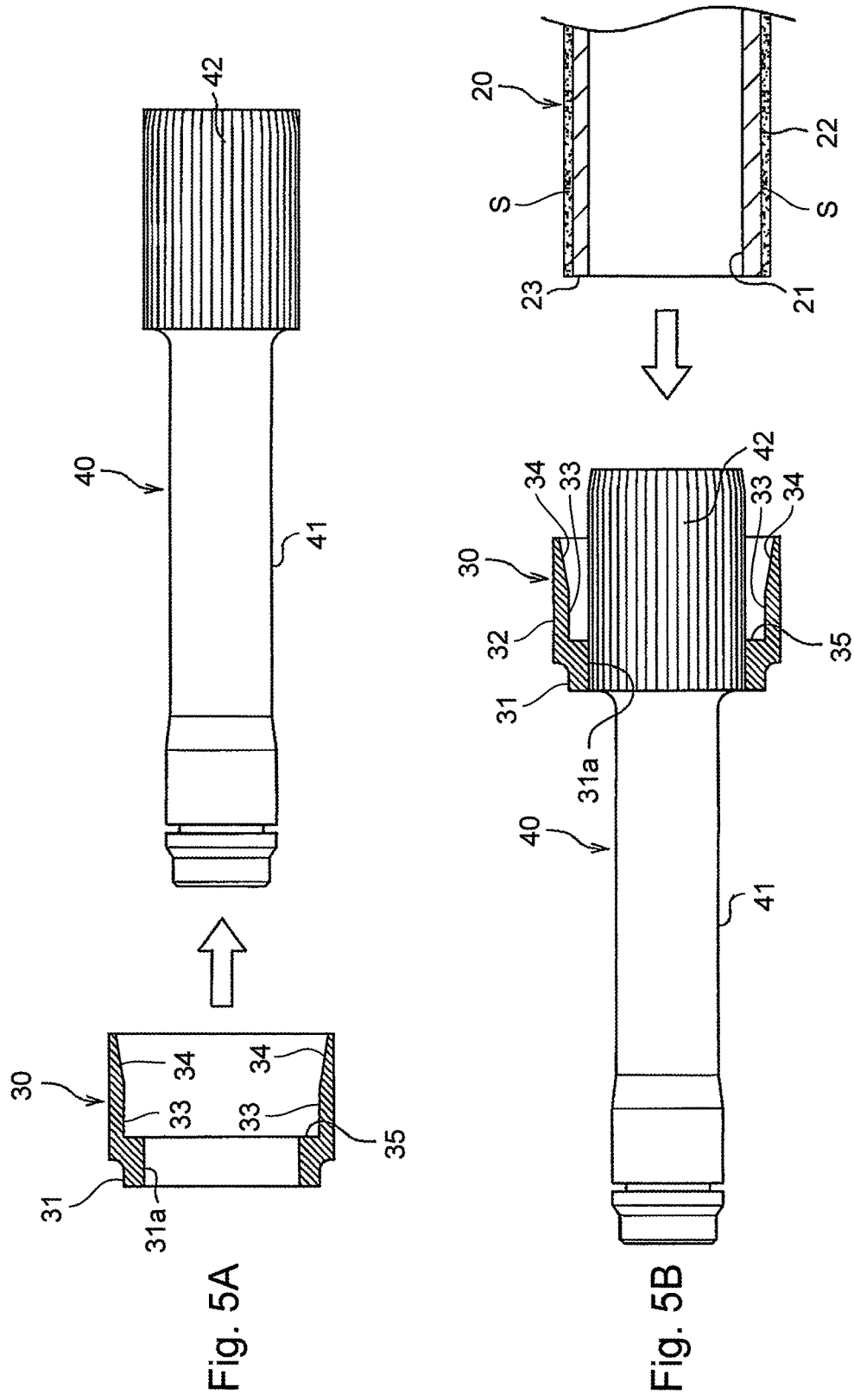
FIGS. 5A and 5B are process drawings illustrating a production method (assembling method) for the FRP drive shaft according to the present invention.

As shown in FIG. 5A, the press-fitting portion 31a of the small-diameter collar portion 31 of each outer collar 30 is press-fitted onto another portion (at the base end) of the serrated portion 42 of one end joint 40 that is not press-fitted into the inner periphery 21 of the FRP cylinder 20, with the end joint 40 fixed to a fixing jig (not shown). This forms a combination of the outer collar 30 and the end joint 40.

As shown in FIG. 5B, after the outer periphery 22 of the FRP cylinder 20 is coated with the adhesive S, the inner periphery 21 of the FRP cylinder 20 is press-fitted onto the portion (at the fore end) of the serrated portion 42 of each end joint 40 that is not press-fitted into the press-fitting portion 31a of the small-diameter collar portion 31 of the associated outer collar 30. Thereupon, the adhesive S that is applied on the outer periphery 22 of the FRP cylinder 20 is filled in between the inner periphery (the constant-diameter portion 33 and the adhesive-accumulating tapered portion 34) of the large-diameter collar portion 32 and the outer periphery of the FRP cylinder 20, is filled in between the axis-orthogonal wall 35 and the end surface 23 of the FRP cylinder 20, and is filled in between the press-fitting portion 31a of the small-diameter collar portion 31 and the serrated portion 42 (in the clearance CL). This forms a combination of the FRP cylinder 20, the outer collar 30 and the end joint 40, so that the FRP drive shaft 10 is completed.

In the process shown in FIG. 5B, the adhesive S with which the outer periphery 22 of the FRP cylinder 20 coated can be spread to every corner without needing to be scraped off because the adhesive-accumulating tapered portion 34 is formed on the inner periphery of the large-diameter portion 32 of each outer collar 30. This makes it possible to increase the joint strength between the FRP cylinder 20, each outer collar 30 and each end joint 40.

In contrast, in the above described comparative example, in which the adhesive-accumulating tapered portion 34 is not formed on the inner periphery of the large-diameter portion 32 of each outer collar 30 but is replaced by the constant-diameter portion 33, the adhesive S that is applied on the outer periphery 22 of the FRP cylinder 20 is scraped off, and therefore does not spread to every corner when the serrated portion 42 of each end joint 40 is press-fitted into the inner periphery 21 of the FRP cylinder 20, which causes an adhesive failure. Accordingly, the joint strength between the FRP cylinder 20, each outer collar 30 and each end joint 40 becomes insufficient.

Figure 6:
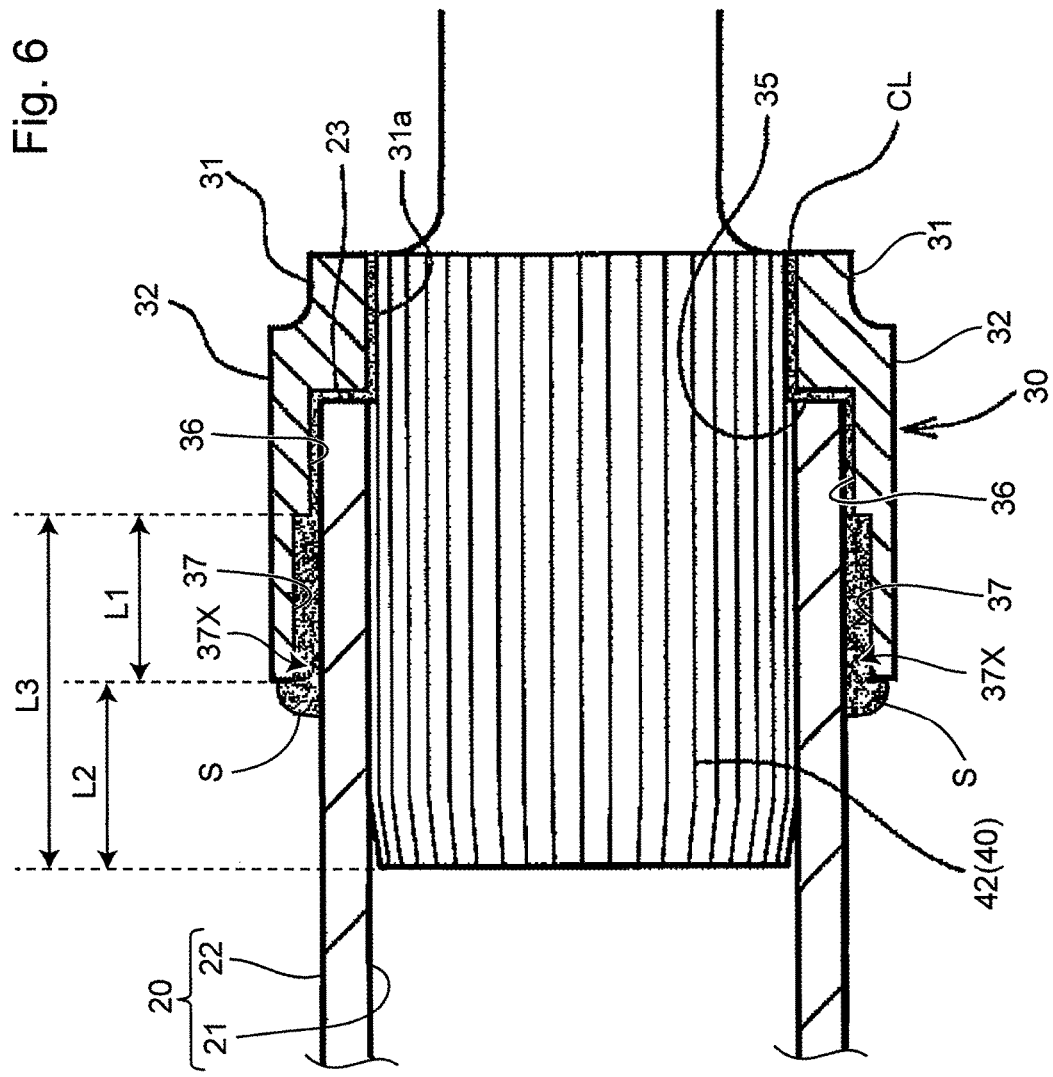
FIG. 6 is an enlarged view, similar to that of FIG. 4, illustrating another embodiment of the FRP drive shaft according to the present invention.

FIG. 6 shows another embodiment of the FRP drive shaft 10 according to the present invention. In this embodiment, the large-diameter portion 32 is provided on an inner periphery thereof with a small-diameter portion 36 and a large-diameter portion 37. The small-diameter portion 36 is formed on the side closer to the small-diameter collar portion 31, and the distance of the small-diameter portion 36 from the outer periphery 22 of the FRP cylinder 20 is relatively small. The large-diameter portion 37 is formed on the side farther from the small-diameter collar portion 31, and the distance of the large-diameter portion 37 from the outer periphery 22 of the FRP cylinder 20 is relatively great. The gap between the inner periphery (the small-diameter portion 36 and the large-diameter portion 37) of the large-diameter collar portion 32 and the outer periphery 22 of the FRP cylinder 20 is filled with an adhesive S for fixing the inner periphery of the large-diameter collar portion 32 and the outer periphery 22 of the FRP cylinder 20 to each other. An adhesive-accumulating space 37X, which partially (locally) increases the filling amount of the adhesive S, is formed between the large-diameter portion 37 and the outer periphery 22 of the FRP cylinder 20.

The above described embodiments have been described by illustrating the FRP drive shaft 10 that has a structure in which the end joints 40 are joined to either end of the FRP cylinder 20 via the outer collars 30. However, the present invention can also be applied similarly to an FRP drive shaft having a structure in which an end joint is joined only to one end of an FRP cylinder via an outer collar.

The above described embodiments have been described by illustrating the case where the serrated portion 42 of each end joint 40 is press-fitted into the inner periphery 21 of the FRP cylinder 20 and the inner periphery (the press-fitting portion 31a) of the small-diameter collar portion 31 so that the end joint 40 extends along these inner peripheries. However, the serrated portion 42 of each end joint 40 and the inner periphery of the small-diameter collar portion 31 do not necessarily have to be fixed to each other by press-fitting and can be fixed to each other by a different fixing means such as an adhesive.

INDUSTRIAL APPLICABILITY

The FRP drive shaft according to the present invention is suitable for being used for, e.g., a propeller shaft, a drive shaft or a stabilizer bar of a vehicle.

REFERENCE SIGNS LIST

10 FRP drive shaft
20 FRP cylinder
21 Inner periphery
22 Outer periphery

23 End surface
30 Outer collar
31 Small-diameter collar portion
31a Press-fitting portion
32 Large-diameter collar portion
33 Constant-diameter portion
34 Adhesive-accumulating tapered portion
34X Adhesive-accumulating space
35 Axis-orthogonal wall
36 Small-diameter portion
37 Large-diameter portion
37X Adhesive-accumulating space
40 End joint
41 Solid rod portion
42 Serrated portion
CL Clearance
S Adhesive

The invention claimed is:

1. An FRP drive shaft comprising an end joint joined to at least one end of an FRP cylinder via an outer collar,
   wherein said end joint includes a serrated portion on an outer periphery thereof,
   wherein said outer collar includes a small-diameter collar portion and a large-diameter collar portion which is greater in diameter than said small-diameter collar portion,
   wherein said serrated portion is press-fitted into an inner periphery of said FRP cylinder and fixed to an inner periphery of said small-diameter collar portion,
   wherein a gap between an inner periphery of said large-diameter collar portion and an outer periphery of said FRP cylinder is filled with an adhesive for fixing said inner periphery of said large-diameter collar portion and said outer periphery of said FRP cylinder to each other, and
   wherein said inner periphery of said large-diameter collar portion includes a constant-diameter portion which is formed on a first area of said inner periphery of said large-diameter collar portion and an adhesive-accumulating tapered portion which is formed on a second area of said inner periphery of said large-diameter collar portion, said first area of said inner periphery of said large-diameter collar portion being closer to said small-diameter collar portion than said second area of said inner periphery of said large-diameter collar portion,
   wherein a distance between said constant-diameter portion and said outer periphery of said FRP cylinder is substantially constant,
   wherein said adhesive-accumulating tapered portion is configured to progressively increase a radial distance between said adhesive-accumulating tapered portion and said outer periphery of said FRP cylinder in a direction away from said small-diameter collar portion, and
   wherein said adhesive-accumulating tapered portion is open, along an axial direction, at a position where a distance between said adhesive-accumulating tapered portion and said outer periphery of said FRP cylinder is a maximum.

2. The FRP drive shaft according to claim 1, wherein said serrated portion is press-fitted into said inner periphery of said FRP cylinder and said inner periphery of said small-diameter collar portion so as to extend over said inner periphery of said FRP cylinder and said inner periphery of said small-diameter collar portion.

3. The FRP drive shaft according to claim 1, wherein an axial length of said adhesive-accumulating tapered portion is set within a range of 5 mm through 15 mm.

4. The FRP drive shaft according to claim 1, wherein a fore end of said adhesive-accumulating tapered portion and a fore end of said serrated portion are offset from each other within a range of 5 mm through 15 mm.

5. The FRP drive shaft according to claim 1, wherein a base end of said adhesive-accumulating tapered portion and a fore end of said serrated portion are offset from each other within a range of 10 mm through 30 mm.

6. The FRP drive shaft according to claim 1, wherein a taper ratio of said adhesive-accumulating tapered portion is within a range of 0.5/15 through 2/5.

* * * * *